Dec. 17, 1940.　　　W. H. ELLIOTT　　　2,225,042
TIRE
Filed Oct. 8, 1937
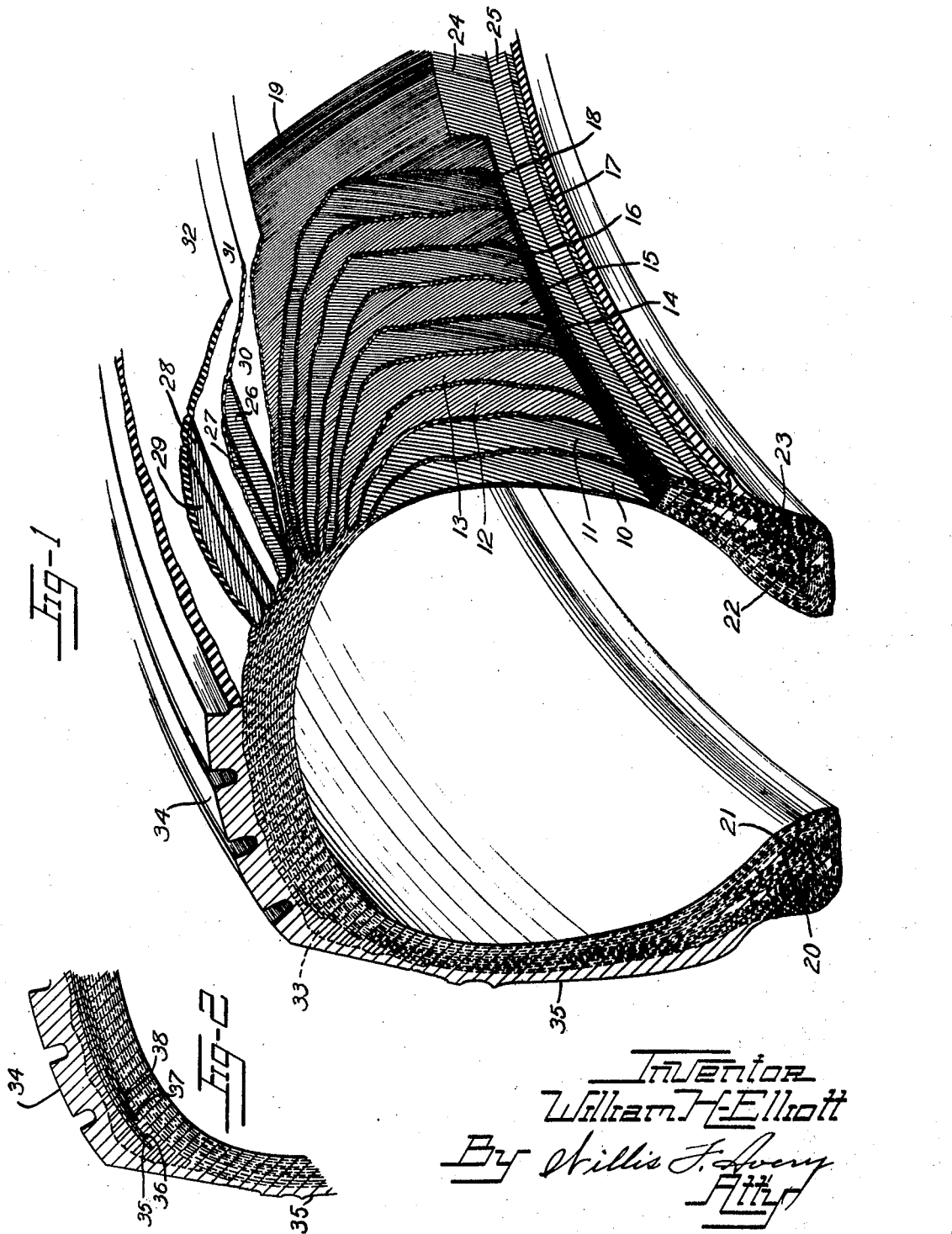

Patented Dec. 17, 1940

2,225,042

UNITED STATES PATENT OFFICE 2,225,042

TIRE

William H. Elliott, Akron, Ohio, assignor to The B. F. Goodrich Company, New York, N. Y., a corporation of New York Application October 8, 1937, Serial No. 167,971

5 Claims. (Cl. 152—356)

This invention relates to tires and it is applicable especially to pneumatic tire casings intended for high speeds under heavy loads such as are encountered in overland buses and coaches and in some types of trucks.

Pneumatic tires for such purposes have been subjected to very severe use especially in that the heavily loaded tire travelling under high speed is subjected to rapid flexing, especially in its sidewall and shoulder of the tread region which tends to cause a severe heating of the elements of the tire casing with a resulting weakening of it, and if the cords or other elements of the tire are stressed unequally breakage often occurs which progresses rapidly through the tire wall and causes premature tire failure.

Cotton cords have been the preferred material for tire wall reinforcement and it has been the practice to dispose a number of superimposed cord plies with the cords of each ply disposed obliquely about the tire and with the cords of alternate plies extending cross-wise of the cords of the other plies. In the large size tire for bus and truck use the increase in the number of plies in such a construction to provide the necessary strength heretofore has materially increased the resistance of the tire wall to flexing with the result that the increase in the temperature of the tire during running has mounted up objectionably and it has been difficult, if not impossible, to provide for uniformly stressing all the cords of the many plies so that the inner-most cords will not be subjected to more than their share of the load. It has been found from examination of such tires when they have failed after a degree of service that the inner-most plies almost invariably have received the most severe flexing and other stresses and have weakened long before the cords of the outer-most plies.

Apparently the severe action of the cords of the inner-plies has resulted in a large measure from the stiffness of these plies caused by the crossed relation of the cords of adjacent plies.

Efforts have been made heretofore to overcome these difficulties but such efforts have been directed for the most part to such expedients as the provision of varying degrees of stretchability of individual cords through the tire sidewall which expedients have been objectionable as complicating the manufacturing procedure and they have not been wholly satisfactory in producing the desired improvement in tire life.

The present invention includes the discovery among other things that surprisingly superior results in tire life under severe use may be obtained by cords of uniform stretchability throughout, preferably a low degree of stretchability, when the cords of the several plies are disposed in a certain manner to be described more fully hereinafter. The invention includes the discovery also of other features of tire construction which may be provided to reduce further the degree of heating of the tire in use and to increase the strength of the tire to resist impacts and other stresses.

The principal objects of the invention are to provide and maintain throughout the useful life of the casing uniform distribution of load on the cords, and to provide longevity of the cord elements by substantial preservation of their original physical properties, and especially to provide a tire construction in which there is less heating as a result of the rapid flexures at high vehicle speeds.

Other objects are to provide protection of the cords from bruising forces, to eliminate separation, excessive wear, and cracking of the tread, to provide desirable distribution of flexibility, to lower operating temperatures in tires especially of low stretch cotton cord construction, to provide increased mileage, and to provide for economy and convenience of manufacture. These and other objects will appear from the following description and the accompanying drawing.

Of the drawing:

Fig. 1 is a perspective view of a section of a tire casing constructed according to and embodying the invention in its preferred form, parts being broken away in steps and sectioned.

Fig. 2 is a fragmentary cross-section of a tire showing a modified construction.

Referring to the drawing in Fig. 1, the invention is applied to a tire of ten inch cross section for high speed truck and bus use, it being understood that the number of plies of cord would not necessarily be the same in tires of other sizes or for different loads. The tire comprises a plurality of plies of rubberized weftless cords or of weak-wefted cord fabric extending from bead to bead, designated by the numerals 10, 11, 12, 13, 14, 15, 16, 17, 18, and 19, and superimposed upon one another, each cord being insulated by its coating of cushion rubber. The margins of the plies are folded about inextensible rubberized metallic bead cores 20, 21, 22, 23, so as to anchor the plies securely to the bead cores. The bead cores may be of any desired construction but preferably are constructed of rubberized metallic tape material. The beads are preferably provided with flippers 24, 25 of fabric which extend between and are anchored to the plies of the casing to provide a tapering flexibility progressively increasing from the beads toward the center of the side walls of the casing.

The improved tire construction includes the feature of a different disposition of the cords of the inner plies than the cords of the outer plies, such as to provide more nearly a uniform stressing of all the cords in the tire sidewall under load and to make possible a sidewall of less gauge for a given tensile strength and of less resistance to flexure so that heating of the tire wall under flexure will be materially reduced.

In order to provide the increased flexibility of the sidewalls, and to assist in distributing the load uniformly over the cords of the casing, a number of the innermost plies of the casing are arranged in pairs with their cords parallel in each pair and the cords of the pairs crossing each other. Thus, plies 10 and 11 have their cords parallel to each other, plies 12 and 13 have their cords arranged parallel to each other, and the plies 12 and 13 have their cords crossing those of plies 10 and 11.

Over these parallel paired plies of cords, the remaining layers are placed in the ordinary alternately disposed or crossed relation of single plies, to strengthen the casing against shock rupture and provide an outer layer region of less extensibility resulting chiefly from the crossed relation of the cords of the adjacent plies in this outer region, which crossed relation prevents a tendency of the cords of one ply to nest between those of the next outer ply during expansion of the tire at the period of manufacture or thereafter in use, while in the innermost or paired parallel plies the cords tend to become nested between the cords of the next outer ply during the expansion of the casing. By this construction the cords may be of cotton and each of a low-stretch characteristic, uniform throughout, and yet a slight expansion of the inner plies is permitted so that these inner cords may move outwardly under the expanding force and be relieved of some of the force upon them by the outer plies of greater resistance to outward movement. This results in a more nearly uniform distribution of the stresses on all the cords rather than an undue amount of stress on the innermost cords and an undue relief of stress on the outermost cords. Also, the greater flexibility of the inner plies makes for less internal friction on flexing in this inner region where heat is less easily dissipated than in the outer regions of the wall which are nearer to the atmosphere.

Besides making the outer plies take their share of the load, it is desirable also that they resist expansion of the tire wall so that the stretch of the surface rubber will be lessened with the result that the surface rubber is more effective to resist wear.

To provide against bruising of the cord plies and consequent breaking of cords therein, which would result in increased internal friction, weakening of the casing and shifting of the load with consequent overloading of adjacent cords, a breaker of a plurality of plies of paired parallel plies of cords is employed and comprises narrow plies 26 and 27 of weftless cord or cord fabric having cords parallel to each other, and plies 28 and 29 also of cords parallel to each other but crossing the cords of plies 26 and 27. The breaker plies are well insulated from the other plies of the casing by a cushion layer of highly elastic rubber 30, the plies 26 and 27 are separated from the plies 28 and 29 by a similar cushion layer 31, and a third and heavier cushion layer 32 extends between the breaker plies and the tread, the ply 32 being thickened at its margins and all of the cushion layers extending laterally beyond the breaker plies and being joined to each other so as completely to surround the breaker plies and to cushion the plies most at their margins by the provision of the thickened cushion 33 thereabout. A cover of rubber comprising a tread 34 and side walls, such as 35 extends over the other portions of the casing from bead to bead and is vulcanized thereto, the tread compound being preferably of a low-hysteresis type to contribute further to low temperature operation.

While the tire casing may be manufactured by any of the well-known methods, I prefer to build it by the drum-built process utilizing an undercut drum.

As a result of the low-temperature operation made possible by the invention, cotton cords are feasible and preferred, but the invention may be used to advantage with cords of rayon or other material.

It is desirable to keep the walls of the casing as thin as possible so as to provide less difference in the widths of the plies and to equalize the load on the cords. As an illustrative example, I find that by using small cords of low-stretch properties, say having a diameter of .032 inch rather than cords of about .036 inch heretofore used in tires of the size commonly used on busses and trucks, the number of cord ends per inch in the plies may be increased from 25 ends, formerly used, to 28 ends, and the number of plies may be reduced from 12 plies, formerly used in a 10.50 tire, to 10 plies resulting in a reduction of thickness of the wall of cords of almost 25% with a corresponding reduction in the number of cords of only about 7%. The novel arrangement of the cords in the casing, wherein the inner plies are arranged with parallel cords in pairs and the outer plies have their cords crossed, results in such a uniform distribution of the loads on the cords and so assists in the protection of the cords from overheating as to permit the use of cords exhibiting as a group less tensile strength than has been found necessary in constructions proposed heretofore, with superior results in the useful life of the tire, nevertheless.

Actual tests made upon tires show that the tensile strength of the cords decreases during the life of the tire in use and that with the cord plies arranged in the alternately crossed relation of prior constructions deterioration is most pronounced in the innermost ply, and least in the outermost ply, I have discovered that the rate of deterioration of the cords as a whole definitely depends upon the maximum temperature generated in the tire in use and that at and above the temperature of about 250° F. which in prior tires has been regularly exceeded in truck and bus use at high speeds, the natural waxes and oils in the cotton are destroyed and charring of the cotton occurs causing failure of the cords.

The use of cords of low extensibility and small cross section, the reduction of wall thickness, increase of wall pliability, and especially the novel arrangement of cord plies in the tire of this invention, are all employed with the view of reducing the working temperature of the casing, and preferably to keep such temperature below 250° F.

In order to determine the mileage and temperature characteristics of such tires, the following test procedure was used: Each tire was rotated in a room, the temperature of which was kept substantially constant at 115° F., against a smooth faced rotating drum on a Sprague testing machine under loads of 3800 lbs., 4200 lbs., and 4600 lbs., at a speed of 45 miles per hour. The temperature of the tires was measured after a 100 mile run at each load on two separate days after which the tire was run to the point of failure at 4600 lbs. load. The tires were then compared by their relative operating temperatures at 4600 lbs., and their life duration under the test. This has been found to constitute a reliable test of a comparative nature. While the mileages obtained have no definite relation to, and are much less than road mileages on the same tires, such tests are generally accepted as reliable indications of comparative tire performance.

The following results were obtained by testing a number of leading makes of high speed bus tires of the same size and regular production construction and a number of tires of the same size and for the same service made according to this invention, the procedure used being as indicated herein above. Where the original tensile strength of the cord is known, it is included in the table. The average tensile strength of the cords of each tire at the end of the test was taken from cords removed from the tire after the test was completed.

| Tire | Cords | Number of plies | Original tensile of cords | Tensile strength of cords at end of test | Temp. | Total mileage |
| --- | --- | --- | --- | --- | --- | --- |
|  |  |  | Pounds | Pounds |  |  |
| A | Cotton | 12 |  | 17.50 | 270 | 472 |
| B | ...do... | 12 |  | 15.18 | 282 | 648 |
| C | ...do... | 12 | 20.00 | 15.92 | 286 | 675 |
| D | ...do... | 10 | 18.30 | 16.98 | 238 | 3,141 |
| E | ...do... | 10 | 18.30 | 16.48 | 234 | 5,681 |
| F | ...do... | 10 | 18.30 | 18.22 | 226 | 2,839 |
| G | ...do... | 10 | 18.30 | 15.92 | 238 | 10,000 |

Tires A, B, and C are of three different leading makes and represent the best tires having cotton cords available heretofore for high speed bus use in the 10.50–22 size. All of the tires shown in the table are of the same nominal size and for the same service. The operating temperatures of these three tires are all between 270° and 286° F., or well above 250°. Their total mileages are all below 700 miles. While the original tensile strength of the cords was known in only one of these tires, their final strengths are very similar, and in tire C, the average tensile strength has dropped 20% in less than 700 miles. The figures plainly show the destructive force of high temperatures upon the cords.

Tires D, E, F, and G differed slightly from each other in the rubber compositions employed and in slight changes in details of construction but each embodied the present invention as hereinabove described. All these are of the same size cord and same construction and arrangement of cord. Only one of these tires, tire D, blew out during test. Tires E and F were removed at the mileages given, when they showed some tread separation and cord breakage in the outer ply. Tire G was removed at 10,000 miles and showed slight cord breakages throughout the various plies of cords, indicating that the forces were balanced over the cords. The drop in tensile strength in the cords of tire G below that of tires E and F is accounted for by the greater length of time during test and increased mileage but all are seen to be decidedly superior to tires A, B, and C. The operating temperatures of tires D, E, F, and G were well below 250° F.

The protection of the tire casing plies from impact blows is important as well as the protection from heat-generation, as any breakage locally of cords sets up internal friction and unbalances the load upon the cords resulting eventually in tire failure.

In the present invention bruise resistance is increased by the use of a double breaker of parallel plies of cords completely insulated from the tread and the cord plies by highly resilient rubber. This construction has distinct advantages over crossed adjacent plies of cords as the cords in ply 29 tend to move under a blow into nesting relation between cords of ply 28, the insulation by the rubber being maintained, however. As they are supported only by the rubber contacting therewith and are not supported by closely spaced cords crossing the same therebeneath, breakage is less likely to occur under a sharp blow, while at the same time the force is distributed through the rubber to the other cord members. The near presence of the plies 26 and 27 of cords extending crosswise of the outer breaker plies, though separated therefrom by a layer of resilient rubber, is adequate to prevent excessive spread of the cords. The floating of the tread upon a heavy layer of cushion rubber over the breaker assists in maintaining tread adhesion and permits greater deflection of the breaker cords. The thicker cushion at the marginal ends of the breaker cords permits greater endwise movement of the cords, provides a more elastic anchorage therefor and reduces internal generation of heat in the region of the margins of the breakers. The advantages of this construction are shown by cold bruise tests in which a weight of 33 pounds is dropped upon the inflated tire from different heights and the cords examined for rupture. With a 10.50–22 tire made according to the invention, it was found necessary to drop the weight from a height of 50 feet before the cords in the outer ply of the breaker were broken whereas with a 10.50–22 tire of standard prior construction, breakage of the outer ply occurred at 20 feet drop and the carcass plies started to break at 30 feet drop.

In the modified form of the invention illustrated in Fig. 2, the construction is the same as that of Fig. 1 except that the breaker ply 35 of cords is much wider than the underlying adjacent breaker ply of cords 36, and the ply 37 is made wider than its underlying ply 38, whereas in the tire of Fig. 1 the ply 29 is made narrower than the ply 28 and the ply 27 is made narrower than the ply 26. In either of these constructions the stepping off of the plies provides a gradual transition from the breaker reinforced portion of the cover to the non-reinforced portion so as to prevent any sharp hinging of the tire at the edge of the breaker. As separation between the tread and the breaker, when such separation occurs, usually starts at the margin of the breaker plies, it is believed that the exposure of a fewer number of such margins to the tread as in the construction illustrated in Fig. 2 will reduce the chance of separation occurring in the tire.

The terms "cord ply" and "cord fabric" in the specification and claims mean a ply or fabric in which the strength-giving cords all extend in the same direction, whether weftless or associated with a weak weft or pick to facilitate handling, and as distinguished from woven fabric in which strength-giving strands are crossed. Variations may be made without departing from the scope of the invention as it is defined in the following claims.

I claim:

1. A tire comprising a body of rubber composition including a tread region, inner and outer groups of plies each comprising strength-giving cotton cords all extending in the same direction in the ply and obliquely within said body about the tire, the plies of the inner group being arranged in radially consecutive sets with all the plies in each set having their cords parallel to the cords in all plies of the same set and in crossed relation to cords in adjacent sets, and the outer group having the cords of adjacent plies disposed in crossed relation, all the cords being insulated by rubber, a breaker within the tread region comprising a plurality of groups of superimposed plies having stepped lateral margins, the cords of each group extending obliquely across the tread and the cords of a ply of each group substantially parallel in relation to the cords of a radially adjacent ply of the same group and in crossed relation to the cords of the adjacent group, and a cushion of rubber softer than the tread rubber about the breaker including the margins thereof.

2. A tire comprising a body of rubber composition including a tread region, radially inner and outer groups of plies each comprising strength-giving cords all extending in the same direction in the ply and obliquely within said body about the tire, the plies of the inner group being arranged in radially consecutive sets with all the plies in each set having their cords parallel to the cords in all plies of the same set and in crossed relation to cords in adjacent sets, and the outer group having the cords of adjacent plies disposed in crossed relation, all the cords being insulated by rubber, a breaker within the tread region comprising a plurality of superimposed cord plies having stepped lateral margins, the cords of each ply extending obliquely across the tread substantially parallel in relation to the cords of a radially adjacent ply of the breaker and in crossed relation to the cords of the adjacent group, and a cushion of rubber about the breaker including the margins thereof.

3. A tire casing comprising in its wall a plurality of plies each comprising strength-giving cords all extending in the same direction in the ply and embedded in rubber-like material, a set of adjacent, superimposed plies at a radially inner portion of the wall having cords of a ply of the set disposed in substantially parallel relation to the cords of an adjacent ply of the set, and a set of adjacent, superimposed plies in a portion of the wall radially outward thereof having the cords of one ply of the set crossed with relation to the cords of an adjacent ply of the set.

4. A tire casing comprising in its wall a plurality of plies each comprising strength-giving cords all extending in the same direction in the ply and embedded in rubber-like material, a plurality of pairs of adjacent, superimposed plies at a radially inner portion of the wall each having the cords of one ply disposed in substantially parallel relation to the cords of the other ply of the pair, and a plurality of pairs of adjacent, superimposed plies in a portion of the wall radially outward thereof each having the cords of one ply crossed with relation to the cords of the other ply of the pair.

5. A tire casing comprising in its wall a plurality of plies each comprising strength-giving cords all extending in the same direction in the ply and embedded in rubber-like material, a set of adjacent, superimposed plies at a radially inner portion of the wall having the cords of a ply disposed in substantially parallel relation to the cords of an adjacent ply, and a set of adjacent, superimposed plies in a portion of the wall radially outward thereof having the cords of one ply crossed with relation to the cords of an adjacent ply of the set, and a breaker in the tread region of the tire comprising at least two adjacent superimposed plies each of strength-giving cords all extending in the same direction in the ply and parallel to the cords of the adjacent ply.

WILLIAM H. ELLIOTT.